UNITED STATES PATENT OFFICE.

GEORGE W. DUNHAM, OF DETROIT, MICHIGAN, ASSIGNOR TO CHALMERS MOTOR COMPANY, OF DETROIT, MICHIGAN, A CORPORATION OF MICHIGAN.

LUBRICATING SYSTEM FOR EXPLOSION-ENGINES.

1,136,219. Specification of Letters Patent. Patented Apr. 20, 1915.

Application filed August 26, 1914. Serial No. 858,741.

*To all whom it may concern:*

Be it known that I, GEORGE W. DUNHAM, a citizen of the United States of America, residing at Detroit, in the county of Wayne and State of Michigan, have invented certain new and useful Improvements in Lubricating Systems for Explosion - Engines, of which the following is a specification, reference being had therein to the accompanying drawings.

The invention relates to lubricating systems for explosion engines, and has particular reference to the means employed for cooling the lubricant so as to preserve the best lubricating-qualities.

A further feature of the invention is the peculiar construction and arrangement of the various elements to be lubricated as hereinafter set forth.

Figure 1:
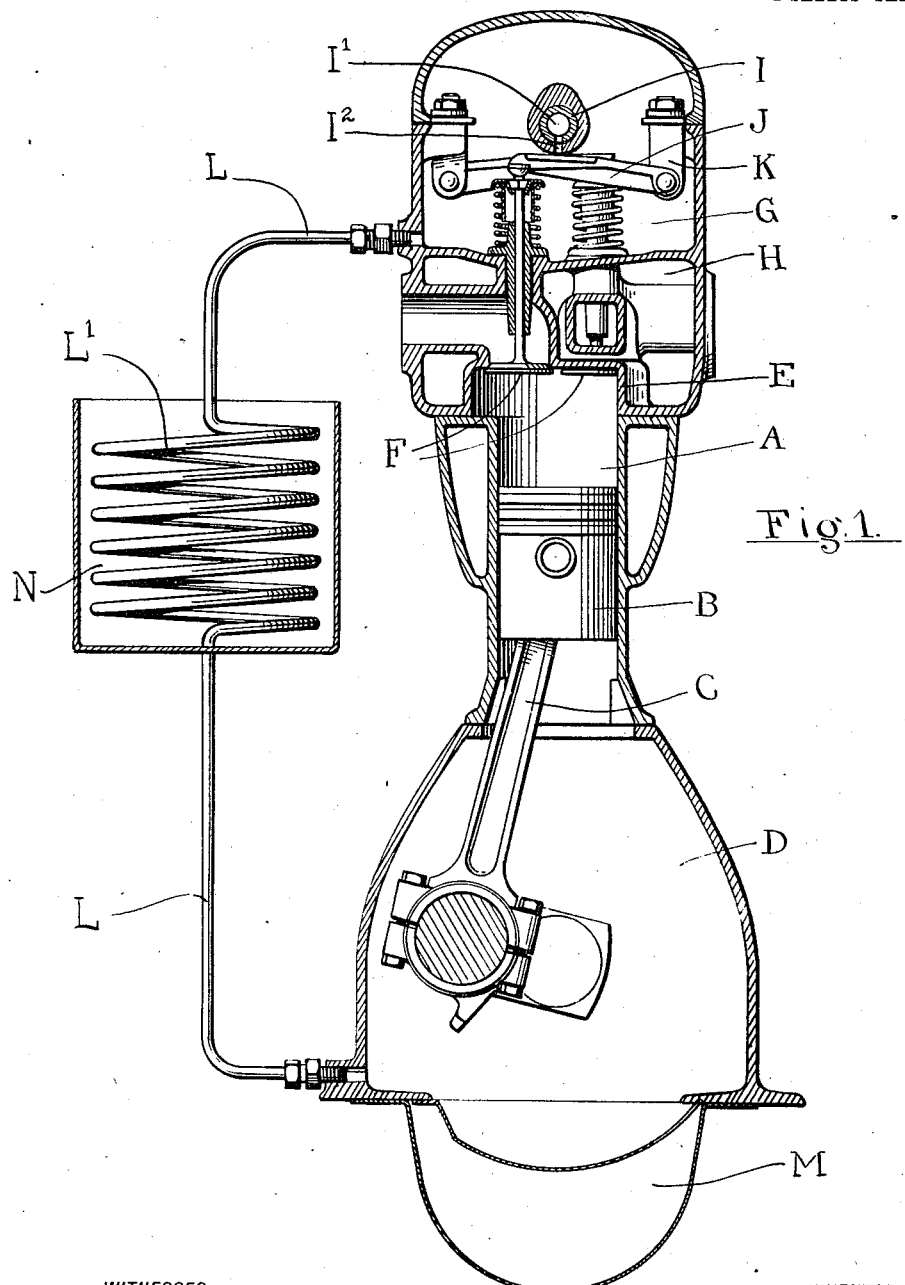
Figure 2:
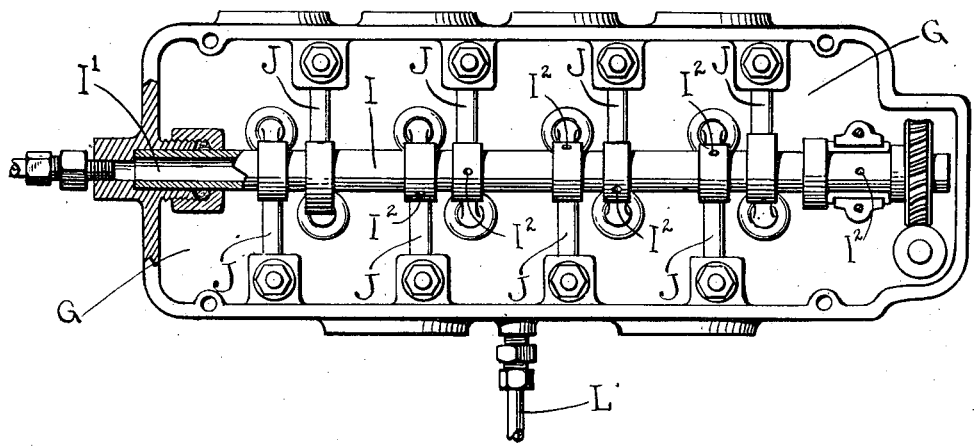
Figure 3:
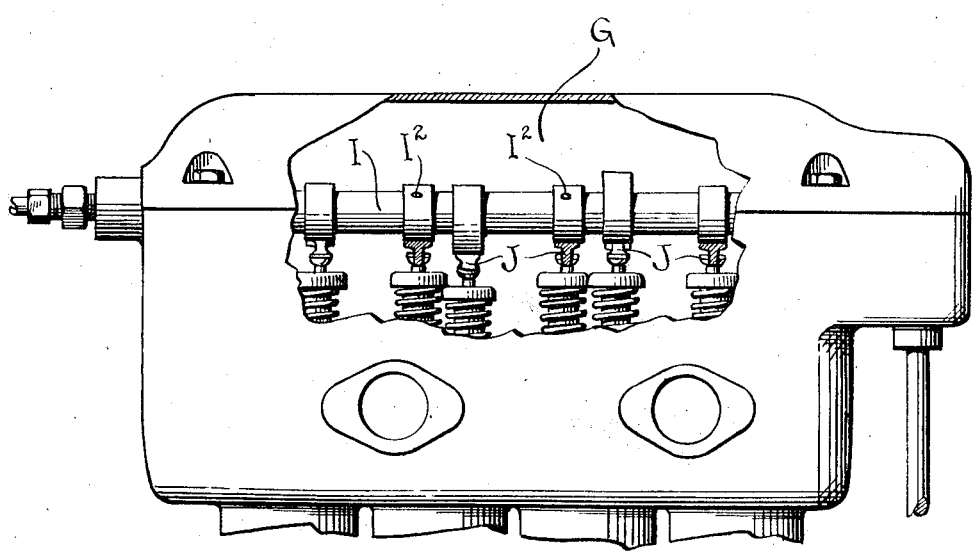

In the drawings:—Figure 1 is a cross section through an engine to which my improvements are applied; Fig. 2 is a plan view thereof; and Fig. 3 is a sectional side elevation.

A is a cylinder of an explosion engine, B the piston, C the pitman rod, D the crank case and E the ported head of the cylinder having valves F with upwardly-extending stems.

G is a chamber in the upper portion of the head E for containing the valve-operating mechanism, said chamber being separated from the cylinder preferably by a water jacket H which surrounds the ports.

I is a cam shaft for actuating the valves through the medium of rocker arms J pivotally connected to brackets K and at their outer ends engaging the valve stems.

For lubricating the valve-actuating mechanism the lubricant is preferably introduced in the chamber G through the cam shaft I, which is hollow or provided with a longitudinal oil passage I' therein. This passage is connected by cross ports I² with the various bearings to be lubricated and also to the cams which engage the rockers J. The lubricant thus distributed in passing off from the bearings will collect in the bottom of the chamber G above the water jacket E, from which it may be conducted through a conduit L to the crank case D for lubricating the parts therein by the usual splash system. Eventually the lubricant collects in the pan M in the bottom of the crank case and may be returned by a suitable pump (not shown) to the channel in the cam shaft I.

The oil collecting in the chamber G above the water jacket will become quite highly heated through contact with the latter. As this would interfere with its efficiency as a lubricant, I have provided means for cooling the oil drawn off from the chamber G before it is introduced into the crank case D. As shown, the conduit L is provided with a radiating coil L' which may be either air cooled or water jacketed, as indicated at N. The cooling effect is sufficient to reduce the temperature of the oil passing therethrough, so that when delivered into the crank case it is at a suitable temperature. Thus the efficiency of the lubricant is maintained, and the same oil may be used for lubricating the valve mechanism and the parts within the crank case.

What I claim as my invention is:—

1. In an explosion engine, a lubricating system including a receptacle exposed to the heat of the engine, and means for cooling the lubricant fed from said receptacle to the mechanism to be lubricated.

2. In an explosion engine, the combination with a lubricant receptacle exposed to the heat of the engine, of a conduit for feeding the lubricant from said receptacle to the mechanism to be lubricated, and a cooler in said conduit.

3. In an explosion engine, the combination with valve mechanism arranged in the head of the engine and exposed to the heat thereof, of a crank case, means for feeding lubricant to said valve mechanism and from the latter to said crank case, and means for cooling the lubricant intermediate said valve mechanism and crank case.

4. In an explosion engine, the combination with a valve housing arranged above the head of the engine cylinder, of a cam shaft in said housing, mechanism operated by said cam shaft for actuating the valve, an oil passage formed in said cam shaft having distributing ports for the various bearings of said mechanism, and a conduit for conveying the lubricant collecting in said housing to the crank case.

5. In an explosion engine, the combination with a cylinder head having a chamber therein for the valve mechanism, of a cam shaft extending through said chamber, mechanism operated by said cam shaft for actuating said valves, a lubricant channel extending through said cam shaft having distributing passages for the various bearings of said mechanism, a conduit for conveying the lubricant collecting in said chamber to the crank case, and a cooler for the lubricant passing through said conduit.

6. In an explosion engine the combination with a valve housing arranged above the head of the engine cylinder and a valve mechanism arranged therein, of means for feeding lubricant to said valve mechanism, means for feeding the lubricant from said housing to the crank case, and a cooler for the lubricant between said housing and crank case.

7. In an explosion engine, the combination with a valve housing arranged in the head of the engine and valve mechanism therein exposed to the heat of said engine, of a crank case, means for feeding lubricant to said valve mechanism, and a conduit between said valve housing and crank case for conducting the lubricant collecting in said housing to said crank case, a portion of said conduit being coiled.

In testimony whereof I affix my signature in presence of two witnesses.

GEO. W. DUNHAM.

Witnesses:
 ENOS R. JACOBY,
 C. E. GREGORY.